(12) United States Patent
McAlister

(10) Patent No.: US 9,188,086 B2
(45) Date of Patent: *Nov. 17, 2015

(54) COUPLED THERMOCHEMICAL REACTORS AND ENGINES, AND ASSOCIATED SYSTEMS AND METHODS

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,198

(22) Filed: Feb. 14, 2011

(65) Prior Publication Data

US 2011/0220040 A1 Sep. 15, 2011

Related U.S. Application Data

(60) Continuation-in-part of application No. 12/804,509, filed on Jul. 21, 2010, which is a continuation-in-part of application No. 12/581,825, filed on Oct. 19, 2009, which is a division of application No. 12/006,774, (Continued)

(51) Int. Cl.
*F02B 43/08* (2006.01)
*C01B 3/00* (2006.01)
(Continued)

(52) U.S. Cl.
CPC ................. *F02M 25/03* (2013.01); *F01N 5/02* (2013.01); *F02M 21/0206* (2013.01); *F02M 21/0227* (2013.01); *F02M 25/12* (2013.01);

(Continued)

(58) Field of Classification Search
USPC .......................... 422/600, 621, 625, 629, 644
See application file for complete search history.

(56) References Cited

U.S. PATENT DOCUMENTS 3,613,792 A 10/1971 Hyde et al.
3,633,372 A 1/1972 Kimmel et al.
(Continued)

FOREIGN PATENT DOCUMENTS

CA 2521698 A1 8/2005
CH 692927 A5 12/2002
(Continued)

OTHER PUBLICATIONS

"Carnot Thermochemical Cycles." Digital image. Wikipedia, the Free Encyclopedia, Published: Aug. 31, 2010. Accessed: Jan 4, 2011. Printed: May 20, 2011. <http://en.wikipedia.org/wiki/File:Carnot_thermochemical_cycles.PNG>. p. 1.
(Continued)

*Primary Examiner* — Kaity Handal
(74) *Attorney, Agent, or Firm* — Perkins Coie LLP

(57) ABSTRACT

Coupled thermal chemical reactors and engines, and associated systems and methods. A system in accordance with a particular embodiment includes a reactor vessel having a reaction zone, a hydrogen donor source coupled in fluid communication with the reaction zone, and an engine having a combustion region. The system can further include a transfer passage coupled between the combustion region and the reaction zone to transfer a reactant and/or radiate energy to the reaction zone. The system can further include a product passage coupled between the reaction zone and the combustion region of the engine to deliver to the combustion region at least a portion of a constituent removed from the reaction zone.

20 Claims, 2 Drawing Sheets

Related U.S. Application Data filed on Jan. 7, 2008, now Pat. No. 7,628,137, said application No. 12/804,509 is a continuation-in-part of application No. 12/653,085, filed on Dec. 7, 2009, which is a continuation-in-part of application No. 12/006,774, said application No. 12/804,509 is a continuation-in-part of application No. PCT/US2009/067044, filed on Dec. 7, 2009.

(60) Provisional application No. 61/237,425, filed on Aug. 27, 2009, provisional application No. 61/237,466, filed on Aug. 27, 2009, provisional application No. 61/237,479, filed on Aug. 27, 2009, provisional application No. 61/238,466, filed on Aug. 31, 2009, provisional application No. 61/312,100, filed on Mar. 9, 2010, provisional application No. 61/304,403, filed on Feb. 13, 2010.

(51) Int. Cl.

| | | |
|---|---|---|
| *F02M 25/03* | (2006.01) | |
| *F01N 5/02* | (2006.01) | |
| *F02M 25/12* | (2006.01) | |
| *F02M 27/02* | (2006.01) | |
| *F02M 51/06* | (2006.01) | |
| *F02M 57/06* | (2006.01) | |
| *F02M 21/02* | (2006.01) | |
| *F02B 75/12* | (2006.01) | |

(52) U.S. Cl.
CPC .......... *F02M 27/02* (2013.01); *F02M 51/0671* (2013.01); *F02M 57/06* (2013.01); *F01N 2240/22* (2013.01); *F02B 2075/125* (2013.01); *Y02T 10/121* (2013.01); *Y02T 10/16* (2013.01); *Y02T 10/32* (2013.01)

(56) References Cited

U.S. PATENT DOCUMENTS

| | | |
|---|---|---|
| 3,662,832 A | 5/1972 | Keeler et al. |
| 3,675,699 A | 7/1972 | Ocone |
| 3,757,860 A | 9/1973 | Pritchett |
| 3,788,389 A | 1/1974 | Waters |
| 3,807,491 A | 4/1974 | Van Hulsen |
| 3,830,508 A | 8/1974 | Endicott |
| 3,840,068 A | 10/1974 | Waters |
| 3,882,937 A | 5/1975 | Robinson |
| 3,936,652 A | 2/1976 | Levine |
| 3,975,912 A | 8/1976 | Greene |
| 3,986,362 A | 10/1976 | Baciu |
| 3,990,502 A | 11/1976 | Best |
| 3,991,817 A | 11/1976 | Clay |
| 4,019,868 A | 4/1977 | Sebacher et al. |
| 4,053,576 A | 10/1977 | Fletcher |
| 4,070,861 A | 1/1978 | Scragg et al. |
| 4,082,865 A | 4/1978 | Ban et al. |
| 4,099,489 A | 7/1978 | Bradley |
| 4,138,993 A | 2/1979 | Conley |
| 4,158,354 A | 6/1979 | Carden |
| 4,161,211 A | 7/1979 | Duffy et al. |
| 4,169,460 A | 10/1979 | Popovich et al. |
| 4,172,506 A | 10/1979 | Terry |
| 4,178,987 A | 12/1979 | Bowman et al. |
| 4,226,213 A | 10/1980 | Bernauer |
| 4,229,184 A | 10/1980 | Gregg |
| 4,257,239 A | 3/1981 | Partin et al. |
| 4,343,338 A | 8/1982 | Hart |
| 4,382,189 A | 5/1983 | Wilson |
| 4,386,801 A | 6/1983 | Chapman et al. |
| 4,401,689 A | 8/1983 | Ban |
| 4,455,045 A | 6/1984 | Wheeler |
| 4,519,342 A | 5/1985 | Yoon |
| 4,549,078 A | 10/1985 | Monahan |
| 4,549,528 A | 10/1985 | Gibson |
| 4,601,508 A | 7/1986 | Kerian |
| 4,611,847 A | 9/1986 | Sullivan |
| 4,620,580 A | 11/1986 | Groezinger et al. |
| 4,704,267 A | 11/1987 | DiMartino |
| 4,706,651 A | 11/1987 | Yudow |
| 4,746,160 A | 5/1988 | Wiesemeyer |
| 4,848,445 A | 7/1989 | Harper |
| 4,921,580 A | 5/1990 | Martes et al. |
| 4,978,162 A | 12/1990 | Labbe |
| 5,058,945 A | 10/1991 | Elliott, Sr. et al. |
| 5,119,897 A | 6/1992 | Moriwake |
| 5,132,090 A | 7/1992 | Volland |
| 5,222,698 A | 6/1993 | Nelson et al. |
| 5,229,102 A | 7/1993 | Minet et al. |
| 5,280,990 A | 1/1994 | Rinard |
| 5,287,004 A | 2/1994 | Finley |
| 5,315,868 A | 5/1994 | Jacobi et al. |
| 5,348,774 A | 9/1994 | Golecki et al. |
| 5,407,245 A | 4/1995 | Geropp |
| 5,442,934 A | 8/1995 | Wolflick |
| 5,498,059 A | 3/1996 | Switlik |
| 5,558,721 A | 9/1996 | Kohmura et al. |
| 5,560,443 A | 10/1996 | DuBose |
| 5,618,134 A | 4/1997 | Balch |
| 5,647,877 A | 7/1997 | Epstein |
| 5,844,324 A | 12/1998 | Spriggle |
| 5,881,559 A * | 3/1999 | Kawamura ...................... 60/597 |
| 5,882,382 A | 3/1999 | Hachisuka et al. |
| 5,986,429 A | 11/1999 | Mula, Jr. |
| 6,012,065 A | 1/2000 | Boucher et al. |
| 6,068,328 A | 5/2000 | Gazdzinski |
| 6,074,696 A | 6/2000 | Sato |
| 6,081,183 A | 6/2000 | Mading et al. |
| 6,089,224 A | 7/2000 | Poulek |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,242,752 B1 | 6/2001 | Soma et al. |
| 6,309,010 B1 | 10/2001 | Whitten |
| 6,334,928 B1 | 1/2002 | Sekine et al. |
| 6,378,932 B1 | 4/2002 | Fasel et al. |
| 6,409,252 B1 | 6/2002 | Andrus |
| 6,464,755 B2 | 10/2002 | Nakanishi et al. |
| 6,502,533 B1 | 1/2003 | Meacham |
| 6,508,209 B1 | 1/2003 | Collier, Jr. |
| 6,531,704 B2 | 3/2003 | Yadav et al. |
| 6,534,210 B2 | 3/2003 | Luken et al. |
| 6,571,747 B1 | 6/2003 | Gerstweiler |
| 6,585,785 B1 | 7/2003 | Warren et al. |
| 6,630,267 B2 | 10/2003 | Badding et al. |
| 6,749,043 B2 | 6/2004 | Brown et al. |
| 6,756,140 B1 | 6/2004 | McAlister |
| 6,756,565 B2 | 6/2004 | Suenaga et al. |
| 6,838,782 B2 | 1/2005 | Vu |
| 6,854,788 B1 | 2/2005 | Graham |
| 6,881,508 B2 | 4/2005 | Penev |
| 6,886,249 B2 | 5/2005 | Smalc |
| 6,889,755 B2 | 5/2005 | Zuo et al. |
| 6,897,575 B1 | 5/2005 | Yu |
| 6,908,297 B2 | 6/2005 | Dafft et al. |
| 6,919,062 B1 * | 7/2005 | Vasileiadis et al. ........ 423/437.1 |
| 6,923,004 B2 | 8/2005 | Chandran et al. |
| 6,926,345 B2 | 8/2005 | Ortega et al. |
| 6,979,049 B2 | 12/2005 | Ortega et al. |
| 6,984,305 B2 | 1/2006 | McAlister |
| 7,014,737 B2 | 3/2006 | Harutyunyan et al. |
| 7,033,570 B2 | 4/2006 | Weimer et al. |
| 7,051,794 B2 | 5/2006 | Luo |
| 7,140,181 B1 | 11/2006 | Jensen et al. |
| 7,152,908 B2 | 12/2006 | Shahbazi |
| 7,165,804 B2 | 1/2007 | Shahbazi |
| 7,179,383 B1 | 2/2007 | Porter et al. |
| 7,185,944 B2 | 3/2007 | Shahbazi |
| 7,207,620 B2 | 4/2007 | Cosgrove et al. |
| 7,210,467 B2 | 5/2007 | Kweon et al. |
| 7,211,905 B1 | 5/2007 | McDavid, Jr. |

(56) References Cited

U.S. PATENT DOCUMENTS

| | | |
|---|---|---|
| 7,237,827 B2 | 7/2007 | Shahbazi |
| 7,243,980 B2 | 7/2007 | Vala |
| 7,250,151 B2 | 7/2007 | Tonkovich et al. |
| 7,285,350 B2 | 10/2007 | Keefer et al. |
| 7,293,533 B2 | 11/2007 | Hemsath |
| 7,337,612 B2 | 3/2008 | Skinnes et al. |
| 7,343,971 B2 | 3/2008 | Pfefferle |
| 7,347,049 B2 * | 3/2008 | Rajendran et al. ............. 60/649 |
| 7,397,141 B2 | 7/2008 | Gouker |
| 7,420,004 B2 | 9/2008 | Hardy et al. |
| 7,426,959 B2 | 9/2008 | Wang et al. |
| 7,434,547 B2 * | 10/2008 | Clawson ........................ 123/3 |
| 7,449,158 B2 | 11/2008 | Haueter et al. |
| 7,484,553 B2 | 2/2009 | Lai et al. |
| 7,504,739 B2 | 3/2009 | Enis et al. |
| 7,527,094 B2 | 5/2009 | McKinzie et al. |
| 7,568,479 B2 | 8/2009 | Rabinowitz |
| 7,582,167 B2 | 9/2009 | Kaszuba et al. |
| 7,585,339 B2 | 9/2009 | Dahl et al. |
| 7,608,120 B2 | 10/2009 | Wunning |
| 7,621,262 B2 | 11/2009 | Zubeck |
| 7,628,137 B1 | 12/2009 | McAlister |
| 7,692,170 B2 | 4/2010 | Gaus et al. |
| 7,713,642 B2 | 5/2010 | Warner et al. |
| 7,714,258 B2 | 5/2010 | Dalton |
| 7,745,026 B2 | 6/2010 | Fan et al. |
| 7,753,122 B2 | 7/2010 | Curlett |
| 7,775,261 B2 | 8/2010 | Valenzuela |
| 7,788,924 B2 | 9/2010 | Hines |
| 7,789,182 B2 | 9/2010 | Bradley et al. |
| 7,799,315 B2 | 9/2010 | Amendola |
| 7,808,121 B1 | 10/2010 | Glynn |
| 7,856,843 B2 | 12/2010 | Enis et al. |
| 7,884,308 B1 | 2/2011 | Mejia |
| 7,910,258 B2 | 3/2011 | Steinberg |
| 7,943,045 B2 | 5/2011 | Rohrich et al. |
| 7,955,478 B2 | 6/2011 | McClure |
| 7,963,328 B2 | 6/2011 | Khinkis et al. |
| 7,971,861 B2 | 7/2011 | Soininen |
| 7,972,471 B2 | 7/2011 | Sant |
| 8,043,592 B2 | 10/2011 | Krass |
| 8,053,916 B2 | 11/2011 | Edwards et al. |
| 8,083,520 B2 | 12/2011 | Mueller et al. |
| 8,136,740 B2 | 3/2012 | Hagen et al. |
| 8,187,549 B2 | 5/2012 | McAlister |
| 8,187,550 B2 | 5/2012 | McAlister |
| 8,202,817 B2 | 6/2012 | Yuge et al. |
| 8,220,539 B2 | 7/2012 | Vinegar et al. |
| 8,318,100 B2 | 11/2012 | McAlister |
| 8,318,131 B2 | 11/2012 | McAlister |
| 8,318,269 B2 | 11/2012 | McAlister |
| 8,449,634 B2 | 5/2013 | Tamura et al. |
| 2001/0000889 A1 | 5/2001 | Yadav et al. |
| 2002/0102188 A1 | 8/2002 | Hsu |
| 2003/0008183 A1 | 1/2003 | Hsu |
| 2003/0019104 A1 | 1/2003 | Smalc |
| 2003/0042128 A1 | 3/2003 | Harutyunyan et al. |
| 2003/0178195 A1 | 9/2003 | Agee et al. |
| 2003/0182861 A1 | 10/2003 | Weimer et al. |
| 2003/0183372 A1 | 10/2003 | Lai et al. |
| 2003/0190569 A1 | 10/2003 | Dafft et al. |
| 2003/0224231 A1 | 12/2003 | Penev |
| 2004/0033455 A1 | 2/2004 | Tonkovich et al. |
| 2004/0200618 A1 | 10/2004 | Piekenbrock |
| 2004/0219737 A1 | 11/2004 | Quon |
| 2004/0247957 A1 | 12/2004 | Hatano et al. |
| 2004/0253168 A1 | 12/2004 | Chu |
| 2004/0265448 A1 | 12/2004 | Shiau et al. |
| 2004/0266615 A1 | 12/2004 | Watson et al. |
| 2005/0019234 A1 | 1/2005 | Luo |
| 2005/0029120 A1 | 2/2005 | Bar-Gadda |
| 2005/0061486 A1 | 3/2005 | Yang |
| 2005/0079977 A1 | 4/2005 | Choi et al. |
| 2005/0230085 A1 | 10/2005 | Valenzuela |
| 2005/0265919 A1 | 12/2005 | Lomax et al. |
| 2005/0272856 A1 | 12/2005 | Cooper et al. |
| 2006/0005738 A1 | 1/2006 | Kumar |
| 2006/0005739 A1 | 1/2006 | Kumar |
| 2006/0048808 A1 | 3/2006 | Ruckman et al. |
| 2006/0266043 A1 | 11/2006 | Jerome |
| 2007/0028860 A1 | 2/2007 | Hemsath |
| 2007/0031718 A1 | 2/2007 | Fujimura et al. |
| 2007/0065686 A1 | 3/2007 | Fan et al. |
| 2007/0138006 A1 | 6/2007 | Oakes et al. |
| 2007/0191664 A1 | 8/2007 | Hershkowitz et al. |
| 2007/0194016 A1 | 8/2007 | Dalton |
| 2007/0199339 A1 | 8/2007 | Ishihara et al. |
| 2007/0204813 A1 * | 9/2007 | Arai et al. .................. 123/25 A |
| 2007/0205298 A1 | 9/2007 | Harrison et al. |
| 2007/0214986 A1 | 9/2007 | Gaus et al. |
| 2007/0220810 A1 | 9/2007 | Leveson et al. |
| 2007/0295477 A1 | 12/2007 | Mueller et al. |
| 2008/0073066 A1 | 3/2008 | Chang et al. |
| 2008/0086946 A1 | 4/2008 | Weimer et al. |
| 2008/0098654 A1 | 5/2008 | Cherry et al. |
| 2008/0170975 A1 | 7/2008 | Ahn et al. |
| 2008/0175766 A1 | 7/2008 | Mankins et al. |
| 2008/0241033 A1 | 10/2008 | Nazri |
| 2008/0257301 A1 * | 10/2008 | Hotta et al. .................. 123/253 |
| 2008/0295883 A1 | 12/2008 | Ducellier et al. |
| 2008/0314411 A1 | 12/2008 | Mueller et al. |
| 2009/0062591 A1 | 3/2009 | Bingue et al. |
| 2009/0071166 A1 | 3/2009 | Hagen et al. |
| 2009/0206666 A1 | 8/2009 | Sella et al. |
| 2009/0232716 A1 | 9/2009 | Rohrich et al. |
| 2009/0313886 A1 | 12/2009 | Hinman et al. |
| 2010/0000874 A1 | 1/2010 | Hinman et al. |
| 2010/0043404 A1 * | 2/2010 | Hebbale et al. ................. 60/286 |
| 2010/0107994 A1 | 5/2010 | Moriarty et al. |
| 2010/0140950 A1 | 6/2010 | Pitre |
| 2010/0174124 A1 | 7/2010 | Tonkovich et al. |
| 2010/0242352 A1 | 9/2010 | Perkins et al. |
| 2011/0061295 A1 | 3/2011 | McAlister |
| 2011/0061383 A1 | 3/2011 | McAlister |
| 2011/0100731 A1 | 5/2011 | Hassan |
| 2011/0197599 A1 | 8/2011 | Stewart et al. |
| 2011/0198211 A1 | 8/2011 | McAlister |
| 2011/0200516 A1 | 8/2011 | McAlister |
| 2011/0203776 A1 | 8/2011 | McAlister |
| 2011/0206565 A1 | 8/2011 | McAlister |
| 2011/0207008 A1 | 8/2011 | McAlister |
| 2011/0209979 A1 | 9/2011 | McAlister |
| 2011/0214986 A1 | 9/2011 | Brown |
| 2011/0220040 A1 | 9/2011 | McAlister |
| 2011/0226988 A1 | 9/2011 | McAlister |
| 2011/0230573 A1 | 9/2011 | McAlister |
| 2011/0284298 A1 | 11/2011 | Ajisaka |
| 2011/0315539 A1 | 12/2011 | Zadik et al. |
| 2012/0118878 A1 | 5/2012 | Kim et al. |
| 2012/0119510 A1 | 5/2012 | Herzen et al. |
| 2013/0094909 A1 | 4/2013 | McAlister |
| 2013/0098035 A1 | 4/2013 | McAlister |
| 2013/0101492 A1 | 4/2013 | McAlister |
| 2013/0101502 A1 | 4/2013 | McAlister |
| 2013/0101908 A1 | 4/2013 | McAlister |
| 2013/0136658 A1 | 5/2013 | McAlister |
| 2013/0145761 A1 | 6/2013 | McAlister |
| 2013/0149208 A1 | 6/2013 | McAlister |
| 2013/0149621 A1 | 6/2013 | McAlister |
| 2013/0153399 A1 | 6/2013 | McAlister |
| 2013/0156504 A1 | 6/2013 | McAlister |
| 2013/0158828 A1 | 6/2013 | McAlister |
| 2013/0174486 A1 | 7/2013 | McAlister |
| 2013/0213256 A1 | 8/2013 | McAlister |

FOREIGN PATENT DOCUMENTS

| | | |
|---|---|---|
| CN | 101042261 A | 9/2007 |
| CN | 101091900 A | 12/2007 |
| CN | 101597025 A | 12/2009 |
| EA | 200702287 A1 | 4/2008 |
| EP | 1394103 A1 | 3/2004 |
| EP | 1658892 | 5/2006 |
| FR | 2923731 A1 | 5/2009 |

(56) References Cited

FOREIGN PATENT DOCUMENTS

| | | |
|---|---|---|
| GB | 24256 | 0/1911 |
| JP | 59046375 | 3/1984 |
| JP | S62203328 A | 9/1987 |
| JP | H02025571 | 1/1990 |
| JP | H04044314 | 2/1992 |
| JP | H0637348 | 5/1994 |
| JP | 0725637 | 3/1995 |
| JP | 0940491 | 2/1997 |
| JP | 09055374 | 2/1997 |
| JP | 10172960 | 6/1998 |
| JP | H11108465 A | 4/1999 |
| JP | 2000271472 A | 10/2000 |
| JP | 2000353690 A | 12/2000 |
| JP | 2001080902 A | 3/2001 |
| JP | 2001181846 A | 7/2001 |
| JP | 2001262353 A | 9/2001 |
| JP | 03215670 B2 | 10/2001 |
| JP | 2002158175 A | 5/2002 |
| JP | 2003040601 A | 2/2003 |
| JP | 2003166059 A | 6/2003 |
| JP | 2005511467 A | 6/2003 |
| JP | 2005021876 A | 1/2005 |
| JP | 2005213069 A | 8/2005 |
| JP | 2007139399 A | 6/2007 |
| JP | 2007150012 A | 6/2007 |
| JP | 2007208076 A | 8/2007 |
| JP | 2007527348 A | 9/2007 |
| JP | 2007254180 A | 10/2007 |
| JP | 2008503709 A | 2/2008 |
| JP | 2009010263 A | 1/2009 |
| JP | 2009500274 A | 1/2009 |
| JP | 2009513466 A | 4/2009 |
| JP | 2010003568 A | 1/2010 |
| JP | 2010006653 A | 1/2010 |
| JP | 2010-025031 | 2/2010 |
| JP | 2011507218 A | 3/2011 |
| KR | 10-0794943 | 1/2008 |
| KR | 20120077307 A | 7/2012 |
| RU | 2011864 C1 | 4/1994 |
| RU | 2120913 C1 | 10/1998 |
| RU | 2312059 C1 | 12/2007 |
| RU | 2403379 C1 | 11/2010 |
| SU | 1498908 A1 | 8/1989 |
| SU | 1776298 | 11/1992 |
| WO | WO-2007053370 A2 | 5/2007 |
| WO | WO-2007140441 A2 | 12/2007 |
| WO | WO-2008031488 A1 | 3/2008 |
| WO | WO-2008035776 A1 | 3/2008 |
| WO | WO-2008076840 A2 | 6/2008 |
| WO | WO-2008093661 A1 | 8/2008 |
| WO | WO-2009098375 A1 | 8/2009 |
| WO | WO-2010097890 A1 | 9/2010 |
| WO | WO-2011154945 A2 | 12/2011 |

OTHER PUBLICATIONS

"Closed Loop Thermochemical Energy Storage System Using Ammonia." Australian National University College of Engineering & Computer Science—Solar Thermal Group. Accessed: Jan. 4, 2011. Printed: May 20, 2011. <http://solar-thermal.anu.edu.au/high-temperature/thermochemical-energy-storage/>. pp. 1-2.

"SI Cycle." Digital image. Sandia National Laboratories: Energy, Resources and Nonproliferation. Accessed: Jan. 4, 2011. Printed: Jun. 13, 2011. <http://www.sandia.gov/ERN/images/SI-cyde2.jpg>. p. 1.

"Solar Hydrogen." Digital image. Swiss Federal Institute of Technology, Department of Mechanical and Process Engineering, Zurich. Accessed: Jan. 4, 2011. Printed: May 23, 2011. p. 1. <http://www.pre.ethz.ch/research/projects/imgs/solarhydro_1.jpg>.

"The Solar Zinc Route." Digital image. Swiss Federal Institute of Technology, Department of Mechanical and Process Engineering, Zurich. Accessed: Jan. 4, 2011. Printed: May 20, 2011. <http://www.pre.ethz.ch/research/projects/imgs/solzinc_1.jpg>. p. 1.

"Zinc Zinc-oxide Thermochemical Cycle." Digital image. Wikipedia, the Free Encyclopedia, Published: Dec. 21, 2008. Accessed: Jan. 4, 2011. Printed: May 20, 2011. <http://en.wikipedia.org/wiki/File:Zinc_zinc-oxide_thermochemical_cycle.jpg>. p. 1.

Chen et al. "Parylene-Encapsulated Copolymeric Membranes as Localized and Sustained Drug Delivery Platforms." Annals of Biomedical Engineering, vol. 37, Issue 10 (Oct. 2009): pp. 2003-2017.

Chen et al. "Thermochemistry Concept Map." Teacherknowledge Wikispace, Published: Nov. 20, 2006. <http://teacherknowledge.wikispaces.com/file/view/Thermochemistry+concept+map+-+Extended.pdf>. p. 1.

Food and Agriculture Organization of the United Nations. "Carbon Sequestration Options under the Clean Development Mechanism to Address Land Degradation." World Soil Resources Reports. Rome, 2000. pp. 1-45.

Foust et al. "An Economic and Environmental Comparison of a Biochemical and a Thermochemical Lignocellulosic Ethanol Conversion Processes." Cellulose, vol. 16, Issue 4. Jun. 10, 2009. pp. 547-565.

Funk, James E. "Thermochemical Processes for the Production of Hydrogen from Water." College of Engineering, University of Kentucky, Lexington, Kentucky. 1975. pp. 1-9.

Hackett et al. "Evaluation of Conversion Technoloigy Processes and Products: Appendix A—Discussion of Thermochemical Process Definitions." University of California, Davis. Sep. 2004. pp. 1-7.

US Environmental Protection Agency. "Carbon Dioxide | Climate Change—Greenhouse Gas Emissions | U.S. EPA". Web. Accessed: Jul. 1, 2010. Printed: Jun. 13, 2011. 1 Page. <http://www.epa.gov/climatechange/emissions/co2.html>.

U.S. Energy Information Administration. "Greenhouse Gases—Energy Explained, Your Guide to Understanding Energy." Web. Accessed: Jul. 1, 2010. Printed: Jun. 13, 2011. 1 Pages. <http://www.eia.gov/energyexplained/index.cfm?page=environment_about_ghg>.

"The Carbon Cycle : Feature Articles." NASA Earth Observatory : Home. Web. Accessed: Jul. 1, 2010. Printed: Jun. 13, 2011. 12 Pages. <http://earthobservatory.nasa.gov/Features/CarbonCycle>.

Kasting, James F. "The Carbon Cycle, Climate, and the Long-Term Effects of Fossil Fuel Burning." U.S. Global Change Research Information Office. 1998. Web. Accessed: Jul. 1, 2010. Printed: Jun. 13, 2011. <http://www.gcrio.org/CONSEQUENCES/vol4no1/carbcycle.html>.

US Environmental Protection Agency. "Cap and Trade." Web. Accessed: Jul. 1, 2010. Printed: Jun. 13, 2011. <http://www.epa.gov/captrade/>.

US Environmental Protection Agency. "EPA Preliminary Analysis of the Waxman-Markey Discussion Draft". Web. Published: Apr. 20, 2009. Accessed: Jul. 1, 2010. Printed: Jun. 13, 2011. <http://www.epa.gov/climatechange/economics/pdfs/WM-Analysis.pdf>.

US Environmental Protection Agency. "Carbon Dioxide—Geologic Sequestration | Climate Change—Greenhouse Gas Emissions | U.S. EPA." Web. Accessed: Jul. 1, 2010. Printed: Jun. 13, 2011. <http://www.epa.gov/climatechange/emissions/co2_geosequest.html>.

First Action Interview Pilot Program Office Action for U.S. Appl. No. 13/027,015; Applicant: McAlister Technologies, LLC; Date of Mailing: Jul. 29, 2011, 4 pages.

First Action Interview Office Action for U.S. Appl. No. 13/027,181; Applicant: McAlister Technologies, LLC; Mailed on Nov. 16, 2011; 15 pages.

First Action Interview Pilot Program Office Action for U.S. Appl. No. 13/026,990; Applicant: McAlister Technologies, LLC; Date of Mailing: Nov. 16, 2011; 15 pages.

First Action Interview Pilot Program Office Action for U.S. Appl. No. 13/026,996; Applicant: McAlister Technologies, LLC; Date of Mailing: Oct. 27, 2011; 19 pages.

First Action Interview Pilot Program Office Action for U.S. Appl. No. 13/027,015; Applicant: McAlister Technologies, LLC; Date of Mailing: Oct. 6, 2011, 4 pages.

(56) References Cited

OTHER PUBLICATIONS

First Action Interview Pilot Program Office Action for U.S. Appl. No. 13/027,215; Applicant: McAlister Technologies, LLC; Date of Mailing: Oct. 27, 2011; 3 pages.

International Search Report and Written Opinion for PCT Application No. PCT/US11/024808; Applicant: McAlister Technologies, LLC; Date of Mailing: Sep. 27, 2011, 9 pages.

Elias et al., "Control of Graphene's Properties by Reversible Hydrogenation: Evidence for Graphene", Science, vol. 23, 2009, pp. 610-613.

International Search Report and Written Opinion for PCT Application No. PCT/US11/024804; Applicant: McAlister Technologies, LLC; Date of Mailing: Oct. 24, 2011; 9 pages.

N. Muradov: "Catalysis of Methane decomposition over elemental carbon", Catalysis Communications, No. 3-4, Jul. 1, 2001, pp. 89-94, p. 89, right-hand column, paragraph 2.

Muradov et al: "Catalytic Dissociation of Hydrocarbons: a Route to CO2-free Hydrogen", 15th Annual Symposium on Catalysis in Petroleum Refining & Petrochemicals.

U.S. Appl. No. 13/685,075, filed Nov. 26, 2012, McAlister.

U.S. Appl. No. 13/684,743, filed Nov. 26, 2012, McAlister.

U.S. Appl. No. 13/832,740, filed Mar. 15, 2013, McAlister.

Solar Collectors, Energy Storage, and Materials, pp. 443-444 (DeWnter, Francis, 1991).

Vegners, Raimonds Maris; "Collodial Carbon and Silica : Their Use in Solar Energy" Table of Contents and Introduction of Thesis, University of Sydney, Feb. 1985, 5 pages.

Wikipedia > Aerogel > Carbon—"Carbon aerogels are also extremely 'black' in the infrared spectrum, reflecting only 0.3% of radiation between 250 nm and 14.3 μm, making them efficient for solar energy collectors," 1 page.

* cited by examiner

COUPLED THERMOCHEMICAL REACTORS AND ENGINES, AND ASSOCIATED SYSTEMS AND METHODS

CROSS-REFERENCE TO RELATED APPLICATIONS

The present application claims priority to and the benefit of U.S. Patent Application No. 61/304,403, filed on Feb. 13, 2010 and titled FULL SPECTRUM ENERGY AND RESOURCE INDEPENDENCE. The present application is a continuation in part of U.S. patent application Ser. No. 12/804,509, filed on Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS, which claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; PCT Application No. PCT/US09/67044, filed Dec. 7, 2009 and titled INTEGRATED FUEL INJECTORS AND IGNITERS AND ASSOCIATED METHODS OF USE AND MANUFACTURE; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. U.S. patent application Ser. No. 12/804,509 is also a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. U.S. patent application Ser. No. 12/804,509 is also a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety. To the extent the foregoing application and/or any other materials incorporated herein by reference conflict with the disclosure presented herein, the disclosure herein controls.

TECHNICAL FIELD

The present application is directed generally to coupled thermochemical reactors and engines, and associated systems and methods. In particular embodiments, such systems can be used to produce clean-burning, hydrogen-based fuels from a wide variety of feedstocks, and can produce structural building blocks (e.g., architectural constructs) from carbon and/or other elements that are released when forming the hydrogen-based fuels.

BACKGROUND

Renewable energy sources such as solar, wind, wave, falling water, and biomass-based sources have tremendous potential as significant energy sources, but currently suffer from a variety of problems that prohibit widespread adoption. For example, using renewable energy sources in the production of electricity is dependent on the availability of the sources, which can be intermittent. Solar energy is limited by the sun's availability (i.e., daytime only), wind energy is limited by the variability of wind, falling water energy is limited by droughts, and biomass energy is limited by seasonal variances, among other things. As a result of these and other factors, much of the energy from renewable sources, captured or not captured, tends to be wasted.

The foregoing inefficiencies associated with capturing and saving energy limit the growth of renewable energy sources into viable energy providers for many regions of the world, because they often lead to high costs of producing energy. Thus, the world continues to rely on oil and other fossil fuels as major energy sources because, at least in part, government subsidies and other programs supporting technology developments associated with fossil fuels make it deceptively convenient and seemingly inexpensive to use such fuels. At the same time, the replacement cost for the expended resources, and the costs of environment degradation, health impacts, and other by-products of fossil fuel use are not included in the purchase price of the energy resulting from these fuels.

In light of the foregoing and other drawbacks currently associated with sustainably producing renewable resources, there remains a need for improving the efficiencies and commercial viabilities of producing products and fuels with such resources.

DETAILED DESCRIPTION

Overview

Figure 1:
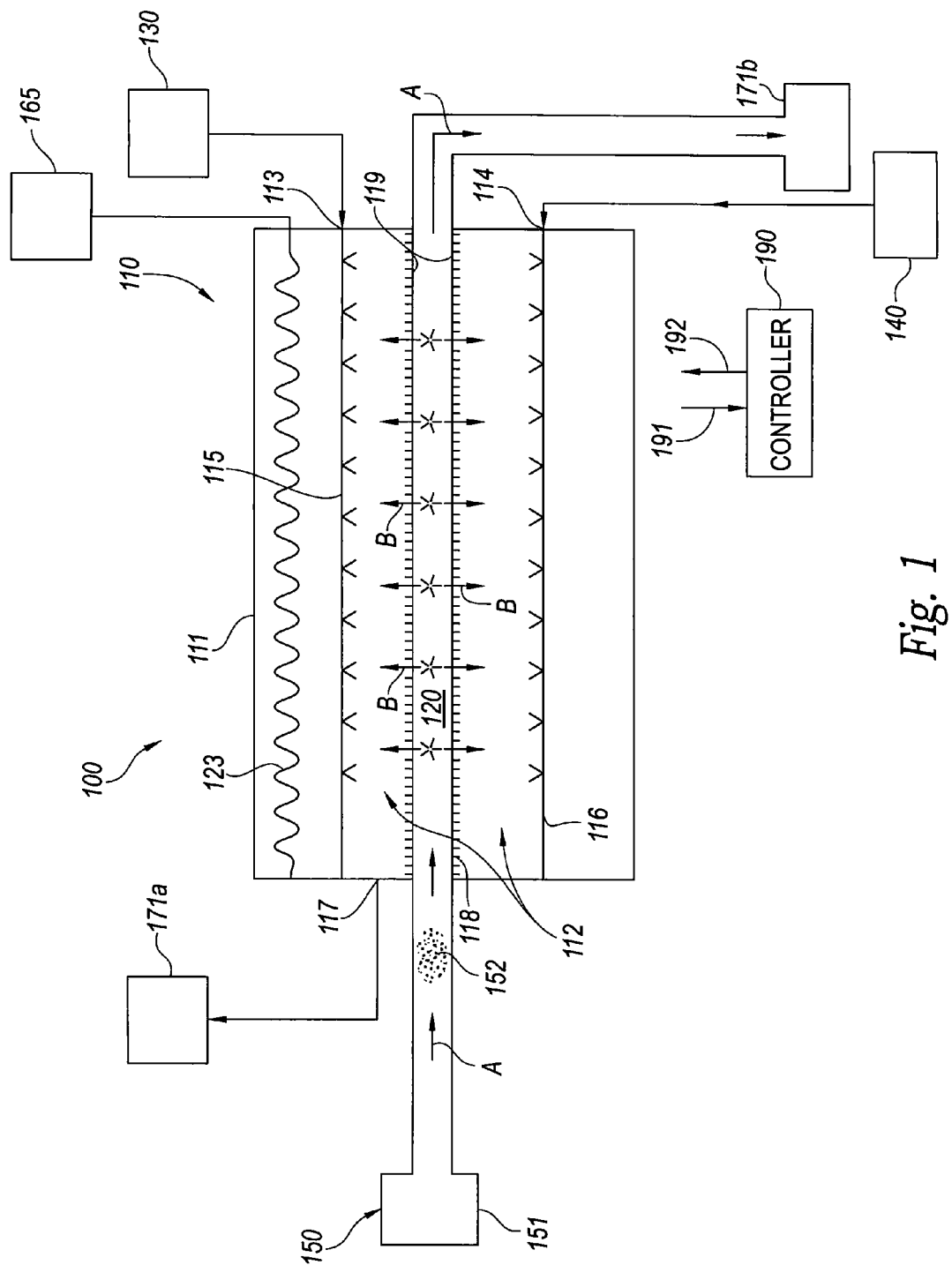
FIG. 1 is a partially schematic, partially cross-sectional illustration of a reactor system that receives energy from a combustion engine in accordance with an embodiment of the presently disclosed technology.

Several examples of devices, systems and methods for efficiently producing hydrogen fuels and structural materials are described below. The efficiencies can result from using waste heat produced by a combustion engine to heat the reactor, and by returning at least some reaction products to the engine for combustion or other purposes. The overall process can result in clean-burning fuel and re-purposed carbon and/or other constituents for use in durable goods, including polymers and carbon composites. Although the following description provides many specific details of the following examples in a manner sufficient to enable a person skilled in the relevant art to practice, make and use them, several of the details and advantages described below may not be necessary to practice certain examples of the technology. Additionally, the technology may include other examples that are within the scope of the claims but are not described here in detail.

References throughout this specification to "one example," "an example," "one embodiment" or "an embodiment" mean that a particular feature, structure, process or characteristic described in connection with the example is included in at least one example of the present technology. Thus, the occurrences of the phrases "in one example," "in an example," "one embodiment" or "an embodiment" in various places throughout this specification are not necessarily all referring to the same example. Furthermore, the particular features, structures, routines, steps or characteristics may be combined in any suitable manner in one or more examples of the technology. The headings provided herein are for convenience only and are not intended to limit or interpret the scope or meaning of the claimed technology.

Certain embodiments of the technology described below may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to any data processor and can include internet appliances, hand-held devices, multi-processor systems, programmable consumer electronics, network computers, mini-computers, and the like. The technology can also be practiced in distributed environments where tasks or modules are performed by remote processing devices that are linked through a communications network. Aspects of the technology described below may be stored or distributed on computer-readable media, including magnetic or optically readable or removable computer discs as well as media distributed electronically over networks. In particular embodiments, data structures and transmissions of data particular to aspects of the technology are also encompassed within the scope of the present technology. The present technology encompasses both methods of programming computer-readable media to perform particular steps, as well as executing the steps.

A system in accordance with a particular embodiment of the technology includes a reactor vessel having a reaction zone, a hydrogen donor source coupled in fluid communication with the reaction zone, and an engine having a combustion region. The system can further include a transfer passage coupled between the combustion region and the reaction zone to transfer a reactant and/or radiant energy to the reaction zone. The system can still further include a product passage coupled between the reaction zone and the combustion region of the engine to deliver to the combustion region at least a portion of a constituent removed from the reaction zone. For example, in particular embodiments, the reactor can dissociate a hydrocarbon, such as methane, using waste heat from the combustion process to facilitate the dissociation process. At least some of the resulting hydrogen fuel, alone or in combination with carbon or a carbon compound, can be returned to the engine for combustion and/or other purposes.

A method in accordance with another embodiment of the technology includes directing a hydrogen donor into a reaction zone of a reactor vessel and combusting a fuel in an engine to produce power and exhaust products. The method can further include directing the exhaust products through a transfer passage coupled between the engine and the reaction zone to transfer a reactant and/or radiant energy to the reaction zone. The method can still further include dissociating the hydrogen donor into dissociation products at the reaction zone and, from the dissociation products, providing a non-hydrogen-based structural building block and/or a hydrogen-based fuel. The method can further include directing a portion of a constituent removed from the reaction zone to the engine. For example, in particular embodiments, the processes include dissociating methane into hydrogen and carbon monoxide, and returning portions of either or both to the engine, e.g., with a fuel constituent, for combustion.

Representative Reactor Systems

Figure 2:
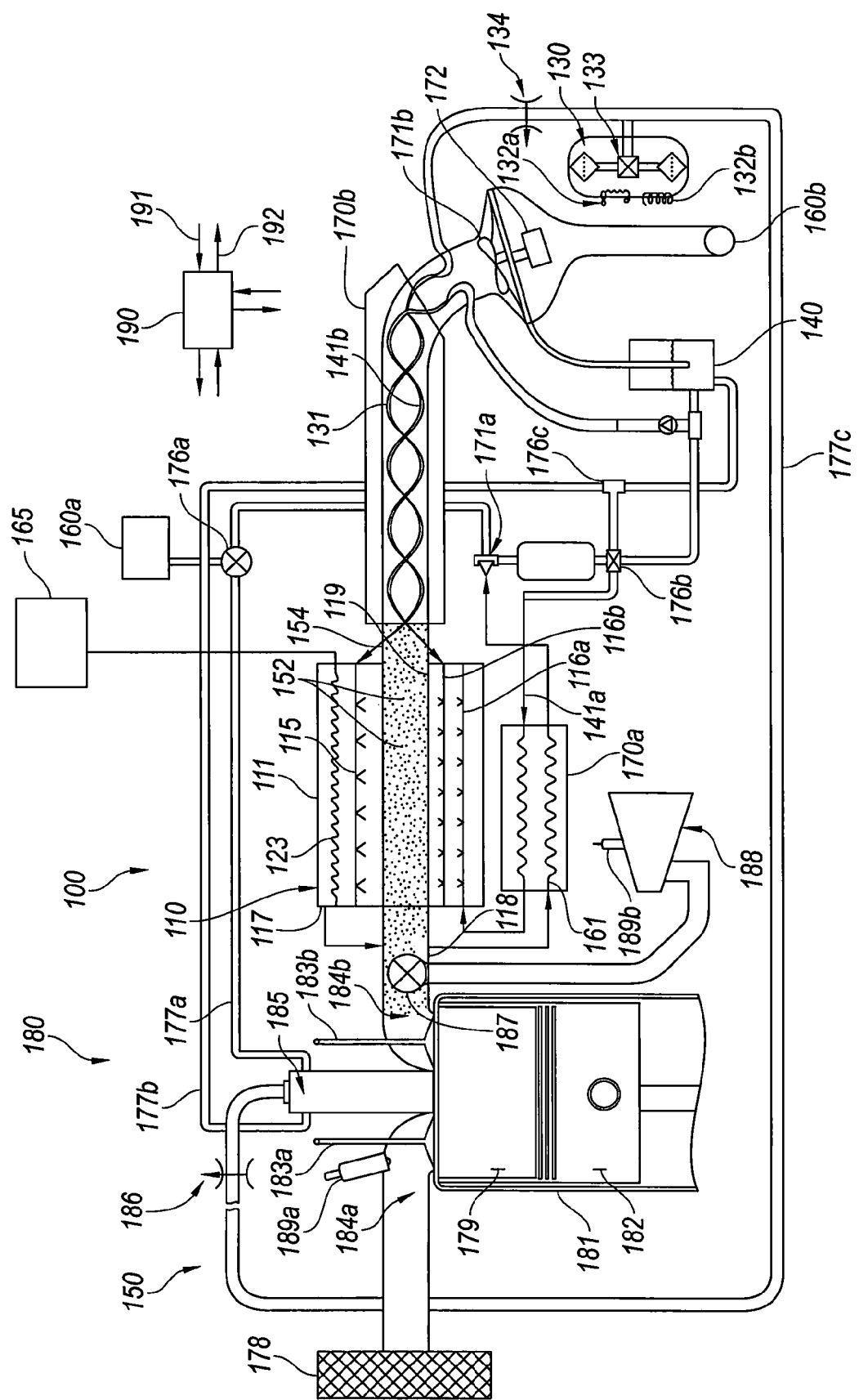
FIG. 2 is a partially schematic, partially cross-sectional illustration of a reactor system that receives energy from a combustion engine and returns reaction products to the engine in accordance with an embodiment of the presently disclosed technology.

FIGS. 1 and 2 illustrate representative reactor systems for producing hydrogen-based fuels and structural building blocks or architectural constructs in accordance with several embodiments of the technology. FIG. 1 illustrates the general arrangement of a reactor that uses waste heat from a combustion process. FIG. 2 illustrates further details of the reactor system, and illustrates mechanisms and arrangements by which the combustion engine and reactor can be coupled in a closed-loop fashion.

FIG. 1 is a partially schematic illustration of a representative system 100 that includes a reactor 110. The reactor 110 further includes a reactor vessel 111 that encloses or partially encloses a reaction zone 112. In at least some instances, the reactor vessel 111 has one or more transmissive surfaces positioned to facilitate the chemical reaction taking place within the reaction zone 112. Suitable transmissive surfaces are disclosed in co-pending U.S. application Ser. No. 13/026,996 titled "REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS" filed concurrently herewith and incorporated herein by reference. In a representative example, the reactor vessel 111 receives a hydrogen donor provided by a donor source 130 to a donor entry port 113. For example, the hydrogen donor can include methane or another hydrocarbon. A donor distributor or manifold 115 within the reactor vessel 111 disperses or distributes the hydrogen donor into the reaction zone 112. The reactor vessel 111 also receives steam from a steam/water source 140 via a steam entry port 114. A steam distributor 116 in the reactor vessel 111 distributes the steam into the reaction zone 112. The reactor vessel 111 can further include a heater 123 that supplies heat to the reaction zone 112 to facilitate endothermic reactions. The power for the heater (e.g., electrical power) can be provided by a renewable energy source 165. The renewable energy source 165 can include a solar, wind, water and/or other suitable sustainable sources. The reactions performed at the reaction zone 112 can include dissociating methane or another hydrocarbon into hydrogen or a hydrogen compound, and carbon or a carbon compound. In other embodiments, the reactor 110 can dissociate other hydrogen donors, e.g. nitrogenous hydrogen donors. Representative reactions are further described in co-pending U.S. application Ser. No. 13/027,208 (now U.S. Pat. No. 8,318,131) titled "CHEMICAL PROCESSES AND REACTORS FOR EFFICIENTLY PRODUCING HYDROGEN FUELS AND STRUCTURAL MATERIALS, AND ASSOCIATED SYSTEMS AND METHODS", filed concurrently herewith and incorporated herein by reference. The products of the reaction exit the reactor vessel 111 via an exit port 117 and are collected at a reaction product collector 171a.

The system 100 can further include a source 150 of radiant energy (e.g., waste heat) and/or additional reactants, which provides constituents to a passage 118 within the reactor vessel 111. For example, the heat/reactant source 150 can include a combustion chamber 151 that provides hot combustion/exhaust products 152 to the passage 118, as indicated by arrow A. The combustion products 152 and associated waste heat are produced by a process separate from the dissociation process (e.g., a power generation process). A combustion products collector 171b collects combustion products exiting the reactor vessel 111 for further recycling and/or other uses. In a particular embodiment, the combustion products 152 can include hot carbon monoxide, water vapor, and/or other constituents. One or more transmissive surfaces 119 are positioned between the reaction zone 112 (which can be disposed annularly around the passage 118) and an interior region 120 of the passage 118. The transmissive surface 119 can accordingly allow radiant energy and/or a chemical constituent to pass radially outwardly from the passage 118 into the reaction zone 112, as indicated by arrows B. By delivering the radiant energy (e.g., heat) and/or chemical constituent(s) provided by the flow of combustion products 152, the system 100 can enhance the reaction taking place in the reaction zone 112, for example, by increasing the reaction zone temperature and/or pressure, and therefore the reaction rate, and/or the thermodynamic efficiency of the reaction. The foregoing process can accordingly recycle or reuse energy and/or constituents that would otherwise be wasted, in addition to facilitating the reaction at the reaction zone 112.

The composition and structure of the transmissive surface 119 can be selected to allow radiant energy to readily pass from the interior region 120 of the passage 118 to the reaction zone 112. Accordingly, the transmissive surface 119 can include glass, graphene, or a re-radiative component. Suitable re-radiative components are described further in co-pending U.S. application Ser. No. 13/027,015 titled "CHEMICAL REACTORS WITH RE-RADIATING SURFACES AND ASSOCIATED SYSTEMS AND METHODS", filed concurrently herewith and incorporated herein by reference.

As noted above, the combustion products 152 can include steam and/or other constituents that may serve as reactants in the reaction zone 112. Accordingly, the transmissive surface 119 can be manufactured to selectively allow such constituents into the reaction zone 112, in addition to or in lieu of admitting radiant energy into the reaction zone 112. In a particular embodiment, the transmissive surface 119 can be formed from a carbon crystal structure, for example, a layered graphene structure. The carbon-based crystal structure can include spacings (e.g., between parallel layers oriented transverse to the flow direction A) that are deliberately selected to allow water molecules to pass through. At the same time, the spacings can be selected to prevent useful reaction products produced in the reaction zone 112 from passing out of the reaction zone. In particular embodiments, the transmissive surface 119 can be formed by using the same type of architectural constructs produced or facilitated by the reactor 110.

The system 100 can further include a controller 190 that receives input signals 191 (e.g., from sensors) and provides output signals 192 (e.g., control instructions) based at least in part on the inputs 191. Accordingly, the controller 190 can include suitable processor, memory and I/O capabilities. The controller 190 can receive signals corresponding to measured or sensed pressures, temperatures, flow rates, chemical concentrations and/or other suitable parameters, and can issue instructions controlling reactant delivery rates, pressures and temperatures, heater activation, valve settings and/or other suitable actively controllable parameters. An operator can provide additional inputs to modify, adjust and/or override the instructions carried out autonomously by the controller 190.

FIG. 2 is a partially schematic illustration of system 100 that includes a reactor 110 in combination with a radiant energy/reactant source 150 in accordance with another embodiment of the technology. In this embodiment, the radiant energy/reactant source 150 includes an engine 180, e.g., an internal combustion engine having a piston 182 that reciprocates within a cylinder 181. In other embodiments, the engine 180 can have other configurations, for example, an external combustion configuration. In an embodiment shown in FIG. 2, the engine 180 includes an intake port 184a that is opened and closed by an intake valve 183a to control air entering the cylinder 181 through an air filter 178. The air flow can be unthrottled in an embodiment shown in FIG. 2, and can be throttled in other embodiments. A fuel injector 185 directs fuel into the combustion zone 179 where it mixes with the air and ignites to produce the combustion products 152. Additional fuel can be introduced by an injection valve 189a. The combustion products 152 exit the cylinder 181 via an exhaust port 184b controlled by an exhaust valve 183b. Further details of representative engines and ignition systems are disclosed in co-pending U.S. application Ser. No. 12/653,085 filed on Dec. 7, 2010, and incorporated herein by reference.

The engine 180 can include features specifically designed to integrate the operation of the engine with the operation of the reactor 110. For example, the engine 180 and the reactor 110 can share fuel from a common fuel source 130 which is described in further detail below. The fuel is provided to the fuel injector 185 via a regulator 186. The engine 180 can also receive end products from the reactor 110 via a first conduit or passage 177a, and water (e.g., liquid or steam) from the reactor 110 via a second conduit or passage 177b. Further aspects of these features are described in greater detail below, following a description of the other features of the overall system 100.

The system 100 shown in FIG. 2 also includes heat exchangers and separators configured to transfer heat and segregate reaction products in accordance with the disclosed technology. In a particular aspect of this embodiment, the system 100 includes a steam/water source 140 that provides steam to the reactor vessel 111 to facilitate product formation. Steam from the steam/water source 140 can be provided to the reactor 110 via at least two channels. The first channel includes a first water path 141a that passes through a first heat exchanger 170a and into the reactor vessel 111 via a first steam distributor 116a. Products removed from the reactor vessel 111 pass through a reactor product exit port 117 and along a products path 161. The products path 161 passes through the first heat exchanger 170a in a counter-flow or counter-current manner to cool the products and heat the steam entering the reactor vessel 111. The products continue to a reaction product separator 171a that segregates useful end products (e.g., hydrogen and carbon or carbon compounds). At least some of the products are then directed back to the engine 180, and other products are then collected at a products collector 160a. A first valve 176a regulates the product flow. Water remaining in the products path 161 can be separated at the reaction product separator 171a and returned to the steam/water source 140.

The second channel via which the steam/water source 140 provides steam to the reactor 110 includes a second water path 141b that passes through a second heat exchanger 170b. Water proceeding along the second water path 141b enters the reactor 110 in the form of steam via a second stream distributor 116b. This water is heated by combustion products that have exited the combustion zone 179 and passed through the transfer passage 118 (which can include a transmissive surface 119) along a combustion products path 154. The spent combustion products 152 are collected at a combustion products collector 160b and can include nitrogen compounds, phosphates, re-used illuminant additives (e.g., sources of sodium, magnesium and/or potassium), and/or other compositions that may be recycled or used for other purposes (e.g., agricultural purposes). The illuminant additives can be added to the combustion products 152 (and/or the fuel used by the engine 180) upstream of the reactor 110 to increase the amount of radiant energy available for transmission into the reaction zone 112.

In addition to heating water along the second water path 141b and cooling the combustion products along the combustion products path 154, the second heat exchanger 170b can heat the hydrogen donor passing along a donor path 131 to a donor distributor 115 located within the reactor vessel 111. The donor vessel 130 houses a hydrogen donor, e.g., a hydrocarbon such as methane, or a nitrogenous donor such as ammonia. The donor vessel 130 can include one or more heaters 132 (shown as first heater 132a and a second heater 132b) to vaporize and/or pressurize the hydrogen donor within. A three-way valve 133 and a regulator 134 control the amount of fluid and/or vapor that exits the donor vessel 130 and passes along the donor path 131 through the second heat exchanger 170b and into the reactor vessel 111. As discussed above, the hydrogen donor can also serve as a fuel for the engine 180, in at least some embodiments, and can be delivered to the engine 180 via a third conduit or passage 177c.

In the reactor vessel 111, the combustion products 152 pass through the combustion products passage 118 while delivering radiant energy and/or reactants through the transmissive surface 119 into the reaction zone 112. After passing through the second heat exchanger 170b, the combustion products 152 can enter a combustion products separator 171b that separates water from the combustion products. The water returns to the steam/water source 140 and the remaining combustion products are collected at the combustion products collector 160b. In a particular embodiment, the separator 171b can include a centrifugal separator that is driven by the kinetic energy of the combustion product stream. If the kinetic energy of the combustion product stream is insufficient to separate the water by centrifugal force, a motor/generator 172 can add energy to the separator 171b to provide the necessary centrifugal force. If the kinetic energy of the combustion product stream is greater than is necessary to separate water, the motor/generator 172 can produce energy, e.g., to be used by other components of the system 100. The controller 190 receives inputs from the various elements of the system 100 and controls flow rates, pressures, temperatures, and/or other parameters.

The controller 190 can also control the return of reactor products to the engine 180. For example, the controller can direct reaction products and/or recaptured water back to the engine 180 via a series of valves. In a particular embodiment, the controller 190 can direct the operation of the first valve 176a which directs hydrogen and carbon monoxide obtained from the first separator 171a to the engine 180 via the first conduit 177a. These constituents can be burned in the combustion zone 179 to provide additional power from the engine 180. In some instances, it may be desirable to cool the combustion zone 179 and/or other elements of the engine 180 as shown. In such instances, the controller 190 can control a flow of water or steam to the engine 180 via second and third valves 176b, 176c and the corresponding second conduit 177b.

In some instances, it may be desirable to balance the energy provided to the reactor 110 with energy extracted from the engine 180 used for other proposes. According, the system 100 can included a proportioning valve 187 in the combustion products stream that can direct some combustion products 152 to a power extraction device 188, for example, a turbo-alternator, turbocharger or a supercharger. When the power extraction device 188 includes a supercharger, it operates to compress air entering the engine cylinder 181 via the intake port 184a. When the extraction device 188 includes a turbocharger, it can include an additional fuel injection valve 189b that directs fuel into the mixture of combustion products for further combustion to produce additional power. This power can supplement the power provided by the engine 180, or it can be provided separately, e.g., via a separate electrical generator.

As is evident from the forgoing discussion, one feature of the system 100 is that it is specifically configured to conserve and reuse energy from the combustion products 152. Accordingly, the system 100 can include additional features that are designed to reduce energy losses from the combustion products 152. Such features can include insulation positioned around the cylinder 181, at the head of the piston 182, and/or at the ends of the valves 183a, 183b. Accordingly, the insulation prevents or at least restricts heat from being conveyed away from the engine 180 via any thermal channel other than the passage 118.

One feature of at least some of the foregoing embodiments is that the reactor system can include a reactor and an engine linked in an interdependent manner. In particular, the engine can provide waste heat that facilitates a dissociation process conducted at the reactor to produce a hydrogen-based fuel and a non-hydrogen based structural building block. The building block can include a molecule containing carbon, boron, nitrogen, silicon and/or sulfur, and can be used to form an architectural construct. Representative examples of architectural constructs, in addition to the polymers and composites described above are described in further detail in co-pending U.S. application Ser. No. 13/027,214 (now U.S. Pat. No. 8,980,416) titled "ARCHITECTURAL CONSTRUCT HAVING FOR EXAMPLE A PLURALITY OF ARCHITECTURAL CRYSTALS" filed concurrently herewith and incorporated herein by reference. An advantage of this arrangement is that it can provide a synergy between the engine and the reactor. For example, the energy inputs normally required by the reactor to conduct the dissociation processes described above can be reduced by virtue of the additional energy provided by the combustion product. The efficiency of the engine can be improved by adding clean-burning hydrogen to the combustion chamber, and/or by providing water (e.g., in steam or liquid form) for cooling the engine. Although both the steam and the hydrogen-based fuel are produced by the reactor, they can be delivered to the engine at different rates and/or can vary in accordance with different schedules and/or otherwise in different manners.

From the foregoing, it will appreciated that specific embodiments of the technology have been described herein for purposes of illustration, but that various modifications may be made without deviating from the technology. For example, certain embodiments of the processes described above were described in the context of methane. In other embodiments, other hydrocarbon fuels or non-carbon-containing hydrogen donors can undergo similar processes to form hydrogen-based fuels and architectural constructs. The waste heat provided by the engine can be supplemented by other waste heat sources, e.g., waste heat from regenerative braking, which can power the heater 123, or can be operatively coupled to the reactor 110 in other manners.

Certain aspects of the technology described in the context of particular embodiments may be combined or eliminated in other embodiments. For example, in some embodiments, the engine can receive hydrogen-based fuel, but not cooling water from the reactor 110, or vise versa. Further while advantages associated with certain embodiments of the technology have been described in the context of those embodiments, other embodiments may also exhibit such advantages, and not all embodiments need necessarily exhibit such advantages to fall within the scope of the present disclosure.

Accordingly, the present disclosure and associated technology can encompass other embodiments not expressly shown or described herein.

To the extent not previously incorporated herein by reference, the present application incorporates by reference in their entirety the subject matter of each of the following materials: U.S. patent application Ser. No. 12/857,553 (now U.S. Pat. No. 8,940,265), filed on Aug. 16, 2010 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES; U.S. patent application Ser. No. 12/857,541, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554 (now U.S. Pat. No. 8,808,529), filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,502, filed on Aug. 16, 2010 and titled ENERGY SYSTEM FOR DWELLING SUPPORT; U.S. patent application Ser. No. 13/027,235 (now U.S. Pat. No. 8,313,556), filed on Feb. 14, 2011 and titled DELIVERY SYSTEMS WITH IN-LINE SELECTIVE EXTRACTION DEVICES AND ASSOCIATED METHODS OF OPERATION; U.S. Patent Application No. 61/401,699, filed on Aug. 16, 2010 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES; U.S. patent application Ser. No. 13/027,208 (now U.S. Pat. No. 8,318,131), filed on Feb. 14, 2011 and titled CHEMICAL PROCESSES AND REACTORS FOR EFFICIENTLY PRODUCING HYDROGEN FUELS AND STRUCTURAL MATERIALS, AND ASSOCIATED SYSTEMS AND METHODS; U.S. patent application Ser. No. 13/026,996, filed on Feb. 14, 2011 and titled REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS; U.S. patent application Ser. No. 13/027,015, filed on Feb. 14, 2011 and titled CHEMICAL REACTORS WITH RE-RADIATING SURFACES AND ASSOCIATED SYSTEMS AND METHODS; U.S. patent application Ser. No. 13/027,244, filed on Feb. 14, 2011 and titled THERMAL TRANSFER DEVICE AND ASSOCIATED SYSTEMS AND METHODS; U.S. patent application Ser. No. 13/026,990 (now U.S. Pat. No. 8,187,549), filed on Feb. 14, 2011 and titled CHEMICAL REACTORS WITH ANNULARLY POSITIONED DELIVERY AND REMOVAL DEVICES, AND ASSOCIATED SYSTEMS AND METHODS; U.S. patent application Ser. No. 13/027,181 (now U.S. Pat. No. 8,187,550), filed on Feb. 14, 2011 and titled REACTORS FOR CONDUCTING THERMOCHEMICAL PROCESSES WITH SOLAR HEAT INPUT, AND ASSOCIATED SYSTEMS AND METHODS; U.S. patent application Ser. No. 13/027,215 (now U.S. Pat. No. 8,318,269), filed on Feb. 14, 2011 and titled INDUCTION FOR THERMOCHEMICAL PROCESS, AND ASSOCIATED SYSTEMS AND METHODS; U.S. Patent Application No. 61/385,508, filed on Sep. 22, 2010 and titled REDUCING AND HARVESTING DRAG ENERGY ON MOBILE ENGINES USING THERMAL CHEMICAL REGENERATION; U.S. patent application Ser. No. 13/027,060 (now U.S. Pat. No. 8,318,100), filed on Feb. 14, 2011 and titled REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS; U.S. patent application Ser. No. 13/027,214 (now U.S. Pat. No. 8,980,416), filed on Feb. 14, 2011 and titled ARCHITECTURAL CONSTRUCT HAVING FOR EXAMPLE A PLURALITY OF ARCHITECTURAL CRYSTALS; U.S. patent application Ser. No. 12/806,634 now U.S. Pat. No. 8,441,361) filed on Aug. 16, 2010 and titled METHODS AND APPARATUSES FOR DETECTION OF PROPERTIES OF FLUID CONVEYANCE SYSTEMS; U.S. patent application Ser. No. 13/027,188 (now U.S. Pat. No. 8,312,759), filed on Feb. 14, 2011 and titled METHODS, DEVICES, AND SYSTEMS FOR DETECTING PROPERTIES OF TARGET SAMPLES; U.S. patent application Ser. No. 13/027,068 (now U.S. Pat. No. 8,318,997), filed on Feb. 14, 2011 and titled SYSTEM FOR PROCESSING BIOMASS INTO HYDROCARBONS, ALCOHOL VAPORS, HYDROGEN, CARBON, ETC.; U.S. patent application Ser. No. 13/027,196 (now U.S. Pat. No. 8,912,239), filed on Feb. 14, 2011 and titled CARBON RECYCLING AND REINVESTMENT USING THERMOCHEMICAL REGENERATION; U.S. patent application Ser. No. 13/027,195 (now U.S. Pat. No. 8,784,095), filed on Feb. 14, 2011 and titled OXYGENATED FUEL; U.S. Patent Application No. 61/237,419, filed on Aug. 27, 2009 and titled CARBON SEQUESTRATION; U.S. Patent Application No. 61/237,425, filed on Aug. 27, 2009 and titled OXYGENATED FUEL PRODUCTION; U.S. patent application Ser. No. 13/027,197 (now U.S. Pat. No. 8,070,835), filed on Feb. 14, 2011 and titled MULTI-PURPOSE RENEWABLE FUEL FOR ISOLATING CONTAMINANTS AND STORING ENERGY; U.S. Patent Application No. 61/421,189, filed on Dec. 8, 2010 and titled LIQUID FUELS FROM HYDROGEN, OXIDES OF CARBON, AND/OR NITROGEN; AND PRODUCTION OF CARBON FOR MANUFACTURING DURABLE GOODS; and U.S. patent application Ser. No. 13/027,185 (now U.S. Pat. No. 8,328,888), filed on Feb. 14, 2011 and titled ENGINEERED FUEL STORAGE, RESPECIATION AND TRANSPORT.

I claim:

1. A chemical reactor system, comprising:
a reactor vessel having a reaction zone, the reactor vessel receiving steam from a steam source that is coupled in fluid communication with the reaction zone of the reactor vessel;
a hydrogen donor source coupled in fluid communication with the reaction zone of the reactor vessel; and
a transfer passage i) positioned within the reaction zone and ii) coupled in fluid communication with a combustion region to transfer a reactant from the combustion region of an engine to an interior region of the transfer passage,
wherein i) the transfer passage includes a transmissive material that is positioned between the reaction zone and the interior region of the transfer passage, and ii) the transmissive material is capable of allowing the reactant to pass from the interior region of the transfer passage to the reaction zone.

2. The system of claim 1, further comprising a heater positioned in thermal communication with the reactor vessel to heat the reaction zone of the reactor vessel.

3. The system of claim 1, further comprising insulation positioned to at least restrict heat transfer away from the engine, other than via the transfer passage.

4. The system of claim 1, further comprising:
a first separator operably coupled between the reactor vessel and the engine to receive products from the reaction zone and segregate a carbon-bearing constituent of the products from a hydrogen-bearing constituent of the products; and
a product passage coupled between the first separator and the combustion region of the engine to deliver to the combustion region at least a portion of the hydrogen-bearing constituent removed from the reaction zone.

5. The system of claim 4, further comprising a second separator operably coupled to the transfer passage downstream of the reaction zone to separate constituents removed from the transfer passage, the second separator having an outlet coupled to the combustion region.

6. The system of claim 4, further comprising:
an injector coupled between the product passage and the combustion region to deliver the hydrogen-bearing constituent directly to the combustion region; and
an air intake port positioned to deliver air directly to the combustion region.

7. The system of claim 6 wherein the air intake port is positioned to provide an unthrottled flow of air directly to the combustion chamber.

8. A chemical reactor system, comprising:
a reactor vessel having a reaction zone, the reactor vessel receiving steam from a steam source that is coupled in fluid communication with the reaction zone of the reactor vessel;
a hydrogen donor source coupled in fluid communication with the reaction zone of the reactor vessel;
a transfer passage i) positioned within the reaction zone and ii) coupled in fluid communication a combustion region to transfer a reactant from the combustion region of an engine to an interior region of the transfer passage, wherein i) the transfer passage includes a transmissive material that is positioned between the reaction zone and the interior region of the transfer passage, and ii) the transmissive material is capable of allowing the reactant to pass from the interior region of the transfer passage to the reaction zone;
a first separator operably coupled to the reactor vessel to receive products from the reaction zone and segregate a carbon-bearing constituent of the products from a hydrogen-bearing constituent of the products; and
a product passage coupled between the first separator and the combustion region of the engine to deliver to the combustion region at least a portion of the hydrogen-bearing constituent removed from the reaction zone.

9. The system of claim 8, further comprising a second separator operably coupled to the transfer passage downstream of the reaction zone to separate constituents removed from the transfer passage, the second separator having an outlet coupled to the combustion region.

10. The system of claim 8, further comprising a heater positioned in thermal communication with the reactor vessel to heat the reaction zone of the reactor vessel.

11. The system of claim 8, further comprising insulation positioned to at least restrict heat transfer away from the engine, other than via the transfer passage.

12. The system of claim 8, further comprising:
an injector coupled between the product passage and the combustion region to deliver the hydrogen-bearing constituent directly to the combustion region; and
an air intake port positioned to deliver air directly to the combustion region.

13. The system of claim 12 wherein the air intake port is positioned to provide an unthrottled flow of air directly to the combustion chamber.

14. A chemical reactor system, comprising:
a reactor vessel having a reaction zone, the reactor vessel receiving steam from a steam source that is coupled in fluid communication with the reaction zone of the reactor vessel;
a hydrogen donor source coupled in fluid communication with the reaction zone of the reactor vessel; and
a transfer passage i) positioned within the reaction zone and ii) coupled in fluid communication with a combustion region to transfer a reactant from the combustion region of an engine to an interior region of the transfer passage,
wherein i) the transfer passage includes a transmissive material that is positioned between the reaction zone and the interior region of the transfer passage, and ii) the transmissive material is capable of allowing the reactant to pass from the interior region of the transfer passage to the reaction zone.

15. The system of claim 14, further comprising:
a first separator operably coupled between the reactor vessel and the engine to receive products from the reaction zone and segregate a carbon-bearing constituent of the products from a hydrogen-bearing constituent of the products.

16. The system of claim 15, further comprising a second separator operably coupled to the transfer passage downstream of the reaction zone to separate constituents removed from the transfer passage, the second separator having an outlet coupled to the combustion region.

17. The system of claim 14, further comprising:
a product passage coupled between a first separator and the combustion region of the engine to deliver to the combustion region at least a portion of a hydrogen-bearing constituent removed from the reaction zone.

18. The system of claim 17, further comprising:
an injector coupled between the product passage and the combustion region to deliver the hydrogen-bearing constituent directly to the combustion region; and
an air intake port positioned to deliver air directly to the combustion region.

19. The system of claim 14, further comprising a heater positioned in thermal communication with the reactor vessel to heat the reaction zone of the reactor vessel.

20. The system of claim 14, further comprising insulation positioned to at least restrict heat transfer away from the engine, other than via the transfer passage.

* * * * *